(12) United States Patent
Izawa

(10) Patent No.: US 6,757,229 B2
(45) Date of Patent: Jun. 29, 2004

(54) INFORMATION REPRODUCING APPARATUS AND INFORMATION REPRODUCING METHOD

(75) Inventor: Toshiaki Izawa, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 425 days.

(21) Appl. No.: 09/819,978

(22) Filed: Mar. 29, 2001

(65) Prior Publication Data

US 2001/0026514 A1 Oct. 4, 2001

(30) Foreign Application Priority Data

Mar. 13, 1910 (JP) ..................................... P2000-099901

(51) Int. Cl.[7] ................................................. G11B 5/09
(52) U.S. Cl. ................................. 369/47.33; 369/53.31
(58) Field of Search .............................. 369/47.3, 47.31, 369/47.32, 47.33, 47.34, 53.18, 53.31, 53.34, 53.35, 53.36, 53.37, 53.29

(56) References Cited

U.S. PATENT DOCUMENTS 4,527,265 A 7/1985 d'Alayer de Costemore d'Arc
5,457,672 A * 10/1995 Shinada et al. .......... 369/53.37
5,748,585 A * 5/1998 Tsukamoto et al. ...... 369/47.23
5,831,946 A * 11/1998 De Bie .................... 369/30.36
6,438,083 B1 * 8/2002 Kroon ..................... 369/47.33

FOREIGN PATENT DOCUMENTS

| EP | 0 570 191 A | 11/1993 |
| EP | 0 620 548 A | 10/1994 |
| JP | 59-195391 | 11/1984 |
| JP | 11-296990 | 10/1999 |
| JP | 11-353793 | 12/1999 |

* cited by examiner

Primary Examiner—Thang V. Tran
(74) Attorney, Agent, or Firm—Morgan, Lewis & Bockius LLP

(57) ABSTRACT

An information reproducing apparatus for reproducing information recorded on an optical disc. A pickup reads the information, and a track buffer memory temporarily accumulates the information therein. A control micro computer start reproducing the information. Then, the computer stops reproducing while accumulating the information in the memory when stop of the reproduction is requested from an external portion during the reproduction. Further, the computer outputs the information accumulated in the memory to resume reproducing it.

14 Claims, 3 Drawing Sheets

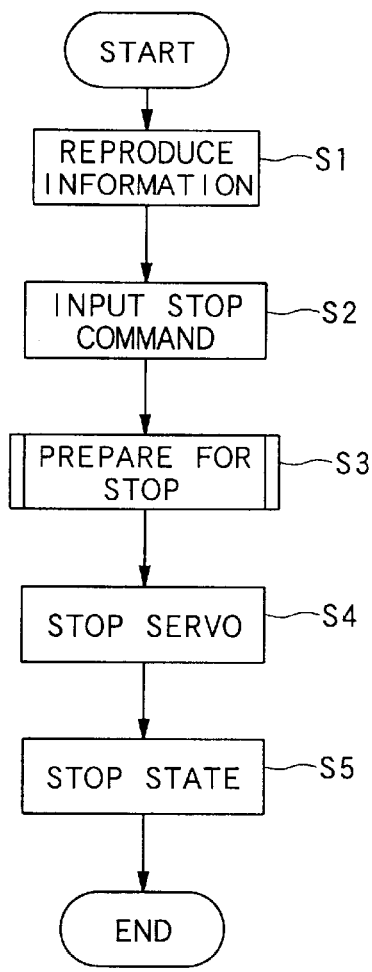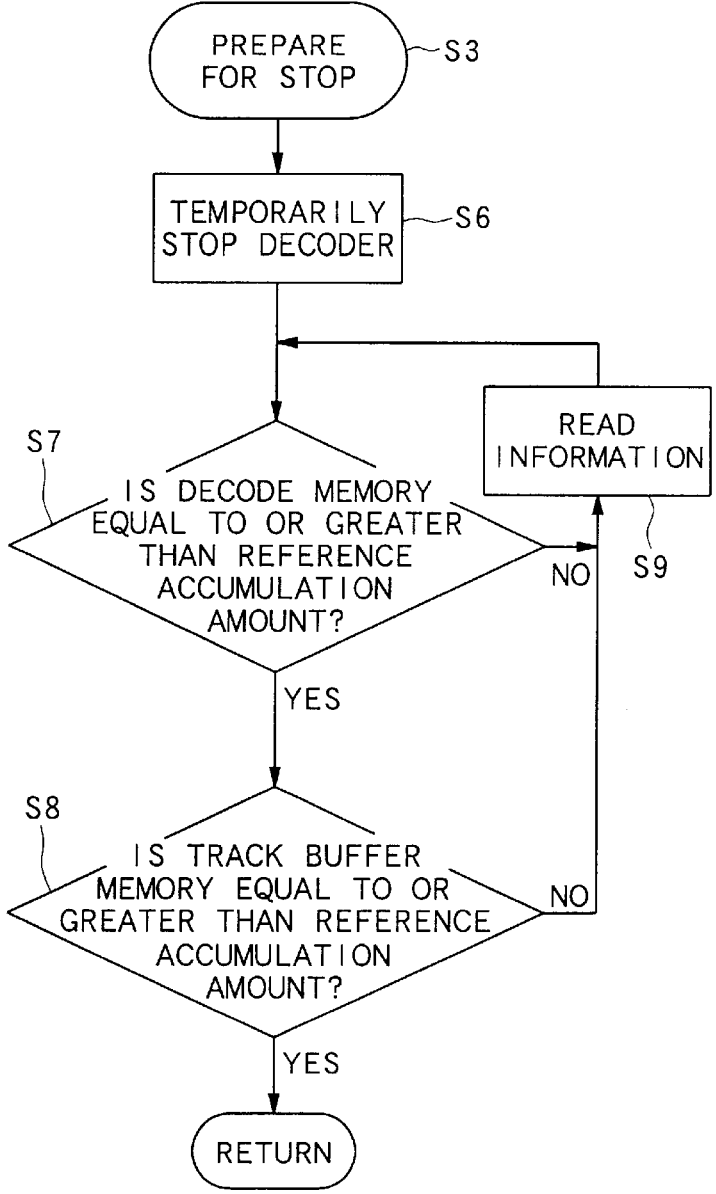

INFORMATION REPRODUCING APPARATUS AND INFORMATION REPRODUCING METHOD

BACKGROUND OF THE INVENTION

1. Field of the Invention

The present invention relates to an information reproducing apparatus and an information reproducing method, and more particularly relates to an information reproducing apparatus and an information reproducing method for carrying out a reproduction control in which the reproduction is stopped in accordance with a command from an external portion during reproduction of information from an information record medium, and after that, the reproduction is resumed.

2. Description of the Related Art

In recent years, an information reproducing apparatus for reproducing an information recorded on an optical disc such as CD (Compact Disc) has been generalized.

As the optical disc that has been generalized in recent years, there is DVD on which a video information and an audio information corresponding to about one movie are recorded. In the information reproducing apparatus for reproducing the information from the DVD, the information read from the DVD is once stored in a buffer memory referred to as a track buffer memory. Then, a necessary amount of the information is outputted to a decoder to carry out a decoding process, so that the information is reproduced.

On the other hand, conventionally, there is a reproducing manner referred to as a continuation reproduction, in which the reproduction is stopped in accordance with a command from an external portion during the reproduction of information from the optical disc. Then, the reproduction is resumed from information following the stopped information.

When the continuation reproduction is carried out in the information reproducing apparatus for the DVD, the reproduction is stopped after a record position (address information) on the DVD of last information out of the information that is actually reproduced and outputted as an image or a sound is stored. Then, a new information is read from the stored record position at the time of resumption of reproduction, so that it is decoded to resume the reproduction.

In the conventional continuation reproduction, the information accumulated in the track buffer memory is perfectly erased at the time of stop of the reproduction. Then, the information read from the record position is newly accumulated at the time of the resumption of the reproduction, so that it is outputted to the decoder for the decoding processing.

However, according to the continuation reproduction method in the conventional information reproducing apparatus, at the time of the resumption of the reproduction, the stored record position is retrieved on the DVD. Then, the information is read from the retrieved record position. Moreover, the read information is accumulated in the track buffer memory. After its accumulation amount becomes equal to a predetermined accumulation amount, the decoding/reproducing processing is started to output the actual image or sound. Thus, this results in a problem that it takes a long time to actually output the image or the sound after a user indicates the resumption of the reproduction.

SUMMARY OF THE INVENTION

The present invention is proposed in view of the above mentioned problems. It is therefore an object of the present invention to provide an information reproducing apparatus and an information reproducing method which after stop of reproduction of information, when the reproduction is resumed from information following information outputted at the time of the stop, an actual information can be quickly outputted to resume the reproduction.

The above object of the present invention can be achieved by an information reproducing apparatus in accordance with the present invention. The information reproducing apparatus is provided with: a reading device for reading reproduction information recorded in an information record medium; a buffering device for temporarily accumulating the read reproduction information therein and outputting it; and a reproduction controlling device for stopping reproducing the reproduction information while maintaining the reproduction information in the buffering device when a command indicative of stop of reproduction is requested from an external portion during the reproduction of the reproduction information, and outputting the reproduction information accumulated in the buffering device to resume reproducing it when a command indicative of resumption of the reproduction is requested from the external portion.

According to the information reproducing apparatus of the present invention, the reading device reads reproduction information recorded in the information record medium. Then, the buffering device temporarily accumulates the read reproduction information therein and outputs it to the reproduction controlling device. The reproduction controlling device start reproducing the reproduction information. However, when the command indicative of the stop of the reproduction is requested from the external portion during the reproduction of the reproduction information, the reproduction controlling device stops reproducing the reproduction information while maintaining the reproduction information in the buffering device. Further, when the command indicative of the resumption of the reproduction is requested from the external portion, the reproduction controlling device outputs the reproduction information accumulated in the buffering device to resume reproducing it.

Therefore, when the reproduction of the reproduction information is resumed, reproduction information following the reproduction information outputted at the time of the stop of the reproduction can be quickly outputted to resume the reproduction.

In one aspect of the information reproducing apparatus of the present invention, a monitoring device monitors an accumulation amount of the reproduction information in the buffering device. Further, the reproduction controlling device stops reading the reproduction information from the information record medium when the accumulation amount of the reproduction information reaches a reference accumulation amount after the stop is indicated, in case where the accumulation amount in the buffering device is less than the reference accumulation amount when the stop of the reproduction is indicated, the reference accumulation amount predetermined on the basis of an output of the reproduction information from the buffering device at the time of the resumption of the reproduction.

According to this aspect, if the stop of the reproduction is indicated when the accumulation amount of the reproduction information is less than the reference accumulation amount, the operation for reading the reproduction information is stopped after the accumulation amount is increased to the reference accumulation amount. Thus, it is possible to reserve the accumulation amount of the reproduction information necessary for the first output when the reproduction is resumed. Hence, the output of the reproduction information is never disconnected at the time of the reproduction.

In another aspect of the information reproducing apparatus, a stop information outputting device outputs predetermined stop information to the external portion during the stop of the reproduction. Further, the reproduction controlling device starts outputting the reproduction information accumulated in the buffering device to the external portion instead of the stop information when a servo control required to read the reproduction information from the information record medium can be resumed at the time of resumption of the reproduction of the reproduction information.

According to this aspect, the output of the accumulated reproduction information is started instead of the stop information, prior to the actual start of the servo control. Thus, the reproduction information can be outputted further quickly when the reproduction is resumed.

In another aspect of the information reproducing apparatus, the reproduction controlling device starts outputting the reproduction information when a servo control required to read the reproduction information from the information record medium can be resumed if the accumulation amount of the reproduction information in the buffering device is less than the reference accumulation amount, and starts outputting the reproduction information before the servo control can be resumed if the accumulation amount of the reproduction information is equal to or greater than the reference accumulation amount.

According to this aspect, if the accumulation amount of the reproduction information is less than the reference accumulation amount, the output of the accumulated reproduction information is started instead of the stop information when the servo control can be resumed. Also, if the accumulation amount of the reproduction information is equal to or greater than the reference accumulation amount, the output of the accumulated information is started instead of the stop information before the servo control can be resumed. Thus, it is possible to resume outputting the information further quickly while preventing the reproduction information from stopping.

In another aspect of the information reproducing apparatus, a decoder decodes the reproduction information outputted from the buffering device. Then, a record position of the reproduction information on the information record medium, which is completely decoded by the decoder when the stop of the reproduction is indicated, is stored in a non-volatile storage device. Further, the reproduction controlling device resumes reading the reproduction information from the stored record position and then resume reproducing the reproduction information, if a supply of an electric power source to the information reproducing apparatus is cut off for the duration from the time when the stop of the reproduction is indicated to the time when the resumption of the reproduction is indicated.

According to this aspect, even if the supply of the electric power source to the information reproducing apparatus is cut off for the duration from the time when the stop of the reproduction is indicated to the time when the resumption of the reproduction is indicated, the reproduction can be resumed from the reproduction information following the reproduction information reproduced at the time of the stop.

In another aspect of the information reproducing apparatus, the information record medium is an optical disc.

According to this aspect, when the reproduction is resumed after the stop of the reproduction of the reproduction information from the optical disc, it is possible to quickly start the output of the reproduction information to resume the reproduction of the reproduction information.

The above object of the present invention can be achieved by an information reproducing method in accordance with the present invention. The information reproducing method is provided with the processes of: reading reproduction information recorded in an information record medium; temporarily accumulating the read reproduction information in a buffering device; stopping reproducing the reproduction information while maintaining the reproduction information in the buffering device when a command indicative of stop of reproduction is requested from an external portion during the reproduction of the reproduction information; and outputting the reproduction information accumulated in the buffering device to resume reproducing it when a command indicative of resumption of the reproduction is requested from the external portion.

According to the information reproducing method of the present invention, the reproduction information recorded in the information record medium is read and temporarily accumulated in the buffering device. Then, it is reproduced. However, when the command indicative of the stop of the reproduction is requested from the external portion during the reproduction of the reproduction information, the reproduction is stopped while the reproduction information is maintained in the buffering device. Also, when the command indicative of the resumption of the reproduction is requested from the external portion, the reproduction information accumulated in the buffering device is outputted and the reproduction is resumed.

Therefore, when the reproduction of the reproduction information is resumed, reproduction information following the reproduction information outputted at the time of the stop of the reproduction can be quickly outputted to resume the reproduction.

In one aspect of the information reproducing method, an accumulation amount of the reproduction information in the buffering device is monitored. Then, the reading of the reproduction information from the information record medium is stopped when the accumulation amount in the buffering device is less than a reference accumulation amount after the stop of the reproduction is indicated, in case where the accumulation amount of the reproduction information reaches the reference accumulation amount when the stop of the reproduction is indicated. The reference accumulation amount is predetermined on the basis of an output of the reproduction information from the buffering device at the time of the resumption of the reproduction.

According to this aspect, when the resumption of the reproduction is indicated after the stop of the reproduction of the reproduction information, it is possible to reduce the time until the output of the information is actually resumed.

In another aspect of the information reproducing method, predetermined stop information is outputted to the external portion during the stop of the reproduction. Then, outputting the reproduction information accumulated in the buffering device to the external portion is started instead of the stop information when a servo control required to read the reproduction information from the information record medium can be resumed at the time of resumption of the reproduction of the reproduction information.

According to this aspect, if the stop of the reproduction is indicated when the accumulation amount of the reproduction information is less than the reference accumulation amount, the operation for reading the reproduction information is stopped after the accumulation amount is increased to the reference accumulation amount. Thus, it is possible to reserve the accumulation amount of the reproduction information necessary for the first output when the reproduction is resumed. Hence, the output of the reproduction information is never disconnected at the time of the reproduction.

In another aspect of the information reproducing method, the process of starting outputting the reproduction information starts outputting the reproduction information when a servo control required to read the reproduction information from the information record medium can be resumed if the accumulation amount of the reproduction information in the buffering device is less than the reference accumulation amount, and starts outputting the reproduction information before the servo control can be resumed if the accumulation amount of the reproduction information is equal to or greater than the reference accumulation amount.

According to this aspect, if the accumulation amount of the reproduction information is less than the reference accumulation amount, the output of the accumulated reproduction information is started instead of the stop information when the servo control can be resumed. Also, if the accumulation amount of the reproduction information is equal to or greater than the reference accumulation amount, the output of the accumulated information is started instead of the stop information before the servo control can be resumed. Thus, it is possible to resume outputting the information further quickly while preventing the reproduction information from stopping.

In another aspect of the information reproducing method, the reproduction information outputted from the buffering device is decoded. Then, a record position of the reproduction information on the information record medium is stored in a non-volatile storage device. The reproduction information is completely decoded when the stop of the reproduction is indicated. Further, if a supply of an electric power source to the information reproducing apparatus is cut off for the duration from the time when the stop of the reproduction is indicated to the time when the resumption of the reproduction is indicated, reading the reproduction information from the stored record position is resumed, and then reproducing the reproduction information is resumed.

According to this aspect, even if the supply of the electric power source to the information reproducing apparatus is cut off for the duration from the time when the stop of the reproduction is indicated to the time when the resumption of the reproduction is indicated, the reproduction can be resumed from the reproduction information following the reproduction information reproduced at the time of the stop.

In another aspect of the information reproducing method, the information record medium is an optical disc.

According to this aspect, when the reproduction is resumed after the stop of the reproduction of the reproduction information from the optical disc, it is possible to quickly start the output of the reproduction information to resume the reproduction of the reproduction information.

BRIEF DESCRIPTION OF THE DRAWINGS

FIG. 2A is a flowchart showing an entire stop processing of the preferred embodiment;

FIG. 2B is a flowchart showing stop preparing processing; and

DESCRIPTION OF THE PREFERRED EMBODIMENT

A preferred embodiment of the present invention will be explained below with reference to FIGS. 1 to 3.

The following embodiment is an embodiment in which the present invention is applied to the case when the above-mentioned continuation reproduction is carried out in the information reproducing apparatus (namely, a DVD player) for reproducing the information recorded in the DVD.

Figure 1:
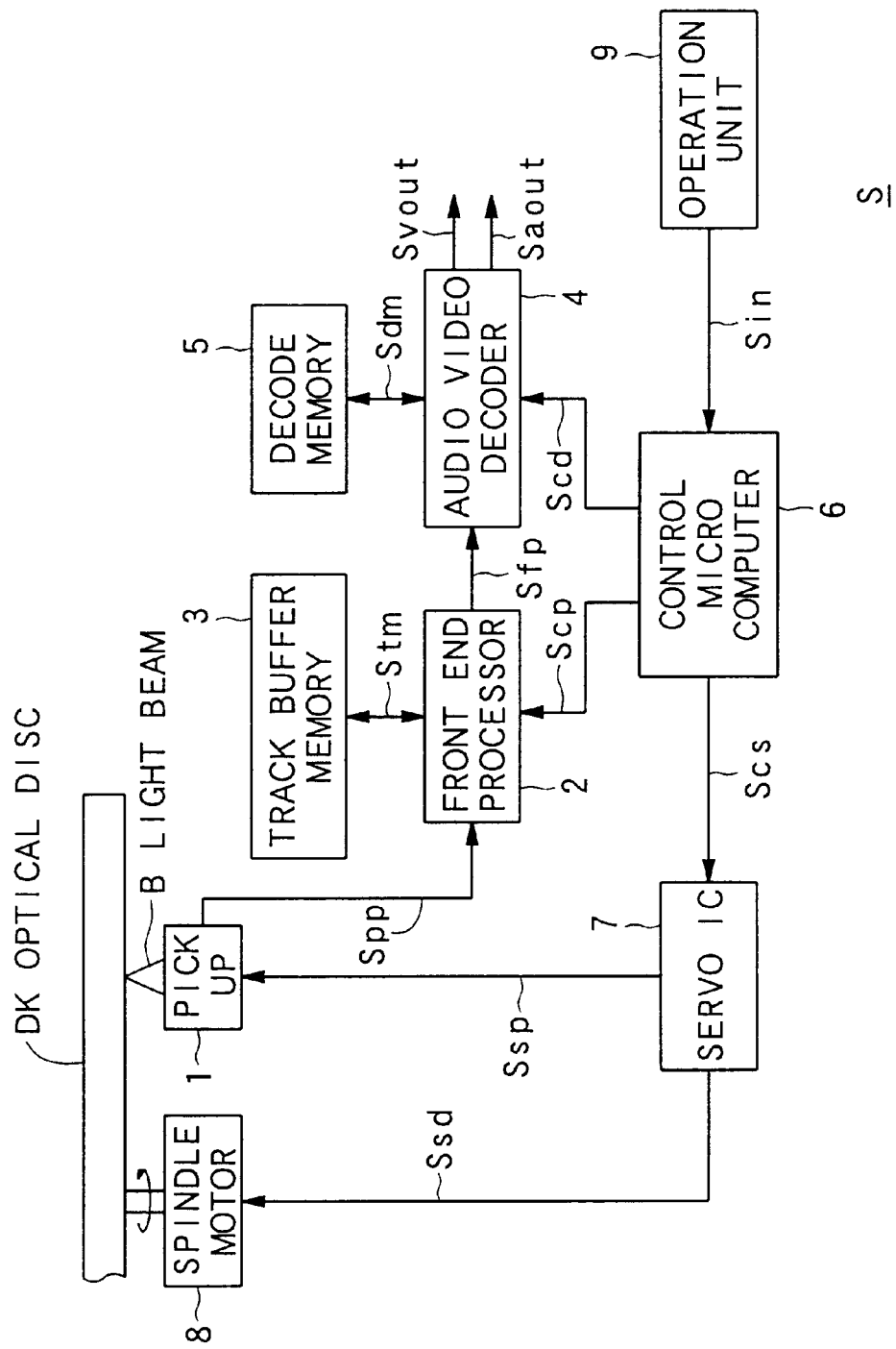
FIG. 1 is a block diagram showing a schematic configuration of an information reproducing apparatus of a preferred embodiment.

As shown in FIG. 1, an information reproducing apparatus S according to the embodiment is provided with: a pickup 1 serving as a reading device; a front end processor 2; a track buffer memory 3 serving as a buffer that is a volatile memory; an audio video decoder 4 serving as a decoder, a decode memory 5 that is a volatile memory; a control micro computer 6 serving as a reproduction controlling device, a monitoring device, a stop information outputting device and a storage device; a servo IC (Integrated Circuit) 7; a spindle motor 8; and an operation unit 9 constituted of a switch, a remote controller, or the like mounted in the information reproducing apparatus S.

The schematic operation will be described below.

At first, the spindle motor 8 rotates an optical disc DK serving as an information record medium that is DVD, at a predetermined rotation number, in accordance with a later-described spindle drive signal Ssd.

The pickup 1 emits a light beam B for information reproduction to the rotating optical disc DK, and generates a detection signal Spp corresponding to an information recorded on the optical disc DK to output it to the front end processor 2.

At this time, deviations in vertical direction and horizontal to the optical disc DK between a focal point of the light beam B and a position of an information track formed on the optical disc DK are cancelled out since an objective lens (not shown) for collecting the light beam B is driven in the vertical direction or horizontal direction in accordance with a later-described pickup servo signal Ssp. Namely, focus servo control and tracking servo control are carried out, while the generation of the DVD is continued.

The front end processor 2, while temporarily storing the detection signal Spp as a memory signal Stm in the track buffer memory 3, in accordance with a control signal Scp from the control micro computer 6, performs a pre-processing, such as a wave form shaping, an amplification or the like, on the detection signal Spp. Then, the front end processor 2 generates a pre-processing signal Sfp corresponding to the detection signal Spp to output it to the audio video decoder 4.

At this time, the front end processor 2 temporarily stores the detection signal Spp in the track buffer memory 3 as the memory signal Stm without discriminating between a video signal and an audio signal included in the detection signal Spp.

The audio video decoder 4 separates and extracts a video signal corresponding to an image and an audio signal corresponding to a sound from the pre-processing signal Sfp, in accordance with a control signal Scd from the control micro computer 6, and temporarily stores the extracted video signal and audio signal as a memory signal Sdm in the decode memory 5. Concurrently with that, the audio video decoder 4 performs a decoding processing on the video signal and the audio signal, respectively, and generates a video output signal Svout corresponding to the video signal to output it to a display (not shown) and the like. Also, the audio video decoder 4 generates an audio output signal Saout corresponding to the audio signal to output it to a speaker (not shown) and the like.

The audio video decoder 4 mutually discriminates between the audio signal and the video signal included in the pre-processing signal Sfp to temporarily store the respective signals in separate regions of the decode memory 5.

On the other hand, when the above-mentioned operations of the respective components are carried out, the control micro computer 6 generates the respective control signals Scp and Scd for controlling the respective processing in the front end processor 2 and the audio video decoder 4, in accordance with an operation signal Sin corresponding to the operation carried out by the operation unit 9, and outputs them to the front end processor 2 and the audio video decoder 4.

The control micro computer 6, when carrying out the continuation reproduction in the information reproducing apparatus S, executes the continuation reproduction processing according to the present invention shown in a later-described flowchart.

In parallel to this execution, the control micro computer 6 generates a control signal Scs in order to output the pickup servo signal Ssp and the spindle drive signal Ssd to the servo IC 7 to output it to the servo IC 7.

Accordingly, the servo IC 7 generates the spindle drive signal Ssd for rotating and driving the spindle motor 8 at the predetermined rotation number to output it to the spindle motor 8, and also generates the pickup servo signal Ssp for controlling a position of the objective lens to output it to the pickup 1.

The continuation reproduction processing according to the embodiment will be described below with reference to FIGS. 2A, 2B and 3.

Figure 3:
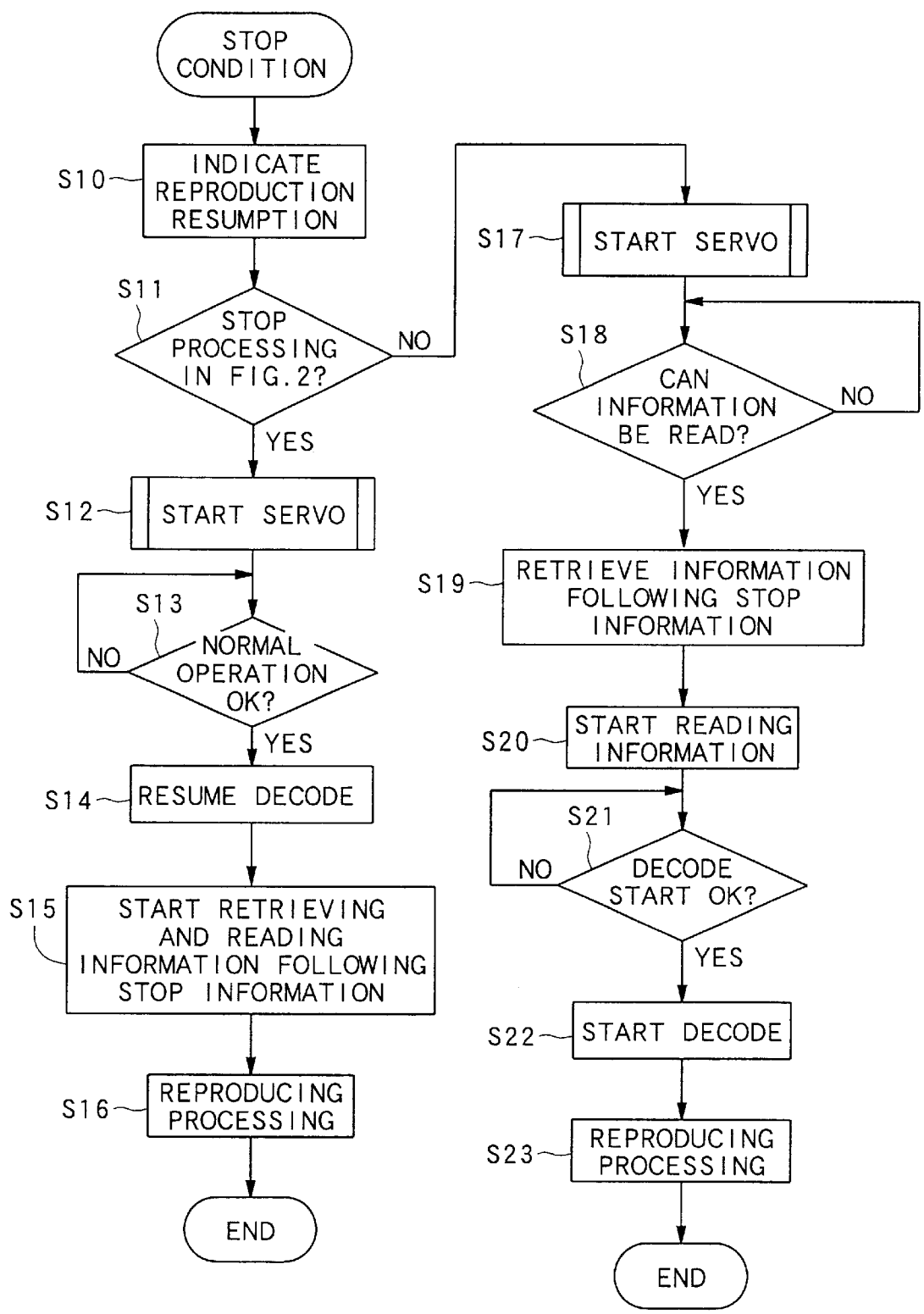
FIG. 3 is a flowchart showing reproduction resuming processing of the preferred embodiment.

The continuation reproduction processing shown in FIGS. 2A, 2B and 3 are executed mainly by the control micro computer 6.

At first, processing at the time of stop of the reproduction in the continuation reproduction processing is described with reference to FIG. 2.

As shown in FIG. 2A, the normal reproducing processing is executed in the information reproducing apparatus S (Step S1). Then, if a user indicates the stop of the reproducing processing by operating the operation unit 9 (Step S2), that is recognized. As a result, the video output signal Svout is generated to be outputted to a display (not shown). The video output signal Svout is a signal for displaying a particular display screen, such as a blue screen and the like, on the display currently outputting an image. Then, preparing processing is carried out for stopping the continuation reproduction according to the embodiment (Step S3).

During the execution of the reproducing processing at the step S1, the reproducing processing is executed while the position on the optical disc DK from which information, such as an image information or the like, is actually read out and its reproduction state (actually, a decode rate, an output level or the like at the time of the reproduction) is updated and stored on demand in a non-volatile memory (not shown) in the control micro computer 6.

In the preparing processing (Step S3), as shown in FIG. 2B, at first, the decoding processing of the audio video decoder 4 is temporarily stopped (at a pause state) (Step S6).

Then, it is determined whether or not an accumulation amount of the decode memory 5 is equal to or greater than a predetermined reference accumulation amount as the decode memory 5 (Step S7).

Since a margin necessary for decoding at the time of the reproduction becomes larger associated with increase in the accumulation amount of the decode memory 5, the reference accumulation amount is predetermined so that the margin meets a necessary amount for decoding promptly at the time of the reproduction. Concretely, it is an accumulation amount under which the outputs of the video output signal Svout and the audio output signal Saout are not disconnected. Therefore, an accumulation amount less than a maximum accumulation amount of the decode memory 5 may be defined as the reference accumulation amount, or the maximum accumulation amount of the decode memory 5 may be defined as it.

If it is determined that the accumulation amount is less than the reference accumulation amount in the determination at the step S7 (Step S7; NO), information is read out from the optical disc DK in order to make the accumulation amount reach the reference accumulation amount so that the accumulation amount is made larger (Step S9). Then, the processing returns back to the step S7.

On the other hand, if it is determined that the accumulation amount is equal to or greater than the reference accumulation amount in the determination at the step S7 (Step S7; YES), it is then determined whether or not an accumulation amount of the track buffer memory 3 is equal to or greater than a predetermined reference accumulation amount as the track buffer memory 3 (Step S8).

Since the margin necessary for decoding at the time of the reproduction becomes larger associated with increase in the accumulation amount of the track buffer memory 3 as well as that of the decode memory 5, the reference accumulation amount of the track buffer memory 3 is predetermined so that the margin meets a necessary amount for decoding promptly at the time of the reproduction. Concretely, it is an accumulation amount under which the outputs of the video output signal Svout and the audio output signal Saout are not disconnected. Therefore, an accumulation amount less than a maximum accumulation amount of the track buffer memory 3 may be defined as the reference accumulation amount, or the maximum accumulation amount of the track buffer memory 3 may be defined as it.

If it is determined that the accumulation amount is less than the reference accumulation amount in the determination at the step S8 (Step S8; NO), information is read out from the optical disc DK in order to make the accumulation amount reach the reference accumulation amount so that the accumulation amount is made larger (Step S9). Then, the processing returns back to the step S7.

On the other hand, if the accumulation amount is equal to or greater than the reference accumulation amount (Step S8; YES), in order to stop the reproduction, the respective servo controls, which are concretely the above-mentioned focus servo control, tracking servo control, a spindle servo control and a carriage servo control, are stopped (Step S4). The state of the information reproducing apparatus S is changed to stop state (Step S5).

When the state is changed to the stop state after the execution of the stop preparing processing shown at the step S3, a flag indicative of the fact is set on a memory (not shown) in the control micro computer 6.

Resuming processing to be executed at the time of the resumption of the reproduction after the stop will be described below with reference to FIG. 3.

In the following resuming processing, it is assumed that a supply of an electric power source to the information reproducing apparatus S has not been cut until start of the following resuming processing after the execution of the stop process shown in FIG. 2.

In the resuming processing, as shown in FIG. 3, if it is recognized that the user operates the operation unit 9 and indicates the resumption of the resuming processing (Step S10), the above-mentioned flag in the memory (not shown) is then checked, or it is checked whether or not the accumulation amount in the decode memory 5 or the track buffer memory 3 is actually equal to or greater than the reference accumulation amount. Then, after the stop preparing processing (refer to the step S3 of FIGS. 2A, 2B) is executed, it is determined whether or not the state is changed to the stop state (Step S11).

If the stop preparing processing is executed (Step S11; YES), the above-mentioned respective servo controls are started (Step S12). Then, it is determined whether or not the servo controls can be expected to be correctly operated (Step S13).

Concretely, it is determined whether or not focus servo loop or tracking servo loop becomes at closed state, with regard to the focus servo control, the tracking servo control and the carriage servo control. On the other hand, it is determined whether or not the rotation of the spindle motor 8 is started with regard to the spindle servo control.

If it is expected that the reproduction can not be done in the determination at the step S13 since any one of the respective servo controls can not be normally operated (Step S13; NO), the processing waits for the cancellation of the state (Step S13). On the other hand, if it is expected that all the servo controls can be normally operated (Step S13; YES), the information currently accumulated in the track buffer memory 3 and the decode memory 5 are immediately outputted to the audio video decoder 4, and the decoding processing is started. Then, the outputs of the video output signal Svout and the audio output signal Saout to the external portion are resumed (Step S14). After that, a read position of the information stored in the non-volatile memory (not shown) in the control micro computer 6 during the execution of the step S1 in FIG. 2 is retrieved by using the pickup 1. Namely, the read position is a record position on the optical disc DK at which the information corresponding to the audio output signal Saout and the video output signal Svout finally outputted from the audio video decoder 4 are recorded. Then, the operation for reading an information following the information recorded at the position is started (Step S15). The processing proceeds to the original reproducing processing (Step S16).

On the other hand, in the determination at the step S11, if the stop preparing processing shown in FIG. 2 is not executed and the state is changed to the stop state (Step S11; NO), the respective servo controls are started similarly to the step S12 (Step S17). Namely, if the above-mentioned flag in the memory (not shown) is not set, or if the accumulation amount in the decode memory 5 or the track buffer memory 3 is not the above-mentioned reference accumulation amount, the respective servo controls are started. In addition, if the information accumulated in the respective memories are lost since the supply of the electrical power source to the information reproducing apparatus S is cut after the stop processing shown in FIG. 2 (Step S11; NO), the respective servo controls are actuated similarly to the step S12 (Step S17). It is determined whether or not the information can be read out from the optical disc DK since the respective servo controls are normally started (Step S18).

If it the state of the information reproducing apparatus S does not proceed to readable state where the information can be read (Step S18; NO), the processing waits for the proceeding (Step S18). On the other hand, if it is at the readable state (Step S18; YES), the read position of the information stored in the non-volatile memory (not shown) in the control micro computer 6 during the execution of the step S1 in FIG. 2 is retrieved by using the pickup 1 (Step S19). Then, it starts reading the information from that position, and accumulating in the track buffer memory 3 and the decode memory 5 (Step S20).

Then, it is determined whether or not the decoding processing and the resumption of the reproduction can be done since the accumulation amount of each memory is equal to or greater than the reference accumulation amount (Step S21). If the resumption of the reproduction can not be done (Step S21; NO), the processing at the step S21 is repeated until it can be done. On the other hand, if the reproduction can be done (Step S21; YES), the decoding processing in the audio video decoder 4 is actually started to resume outputting the video output signal Svout and the audio output signal Saout to the external portion (Step S22). After that, the processing proceeds to the continuation reproduction processing (Step S23).

As mentioned above, according to the continuation reproduction processing in the embodiment, the reproduction is stopped while the information is accumulated in the respective memories. Also, prior to the resumption of the operation for reading the information from the optical disc DK, the accumulated information is outputted to resume reproducing it. Thus, the information following the information outputted at the time of the stop of the reproduction can be quickly outputted at the time of the resumption of the information reproduction, and the reproduction can be resumed.

If the stop of the reproduction is indicated when the accumulation amounts of the information in the respective memories are less than the respective reference accumulation amounts, the operation for reading the information from the optical disc DK is stopped after the accumulation amounts are increased to the reference accumulation amounts (refer to the steps S7, S8 of FIG. 2B). Thus, it is possible to reserve the accumulation amounts of the information necessary for the first output when the reproduction is resumed. Hence, the output of the information is never disconnected at the time of the reproduction.

Moreover, the output of the video output signal Svout of the accumulated information is started instead of the blue screen, prior to the actual starts of the respective servo controls, at the time of the reproduction resumption (refer to the step S14 of FIG. 3). Thus, the information can be outputted further quickly at the time of the resumption of the reproduction.

Furthermore, if the supply of the electric power source is cut between the stop of the reproduction and the resumption of the reproduction (refer to FIG. 3 (Step S11; NO)), the operation for reading the information is resumed from the stored final read position (refer to the step S20 of FIG. 3). The reproduction of the information is resumed. Thus, even if the supply of the electric power source is cut between the stop and the resumption of the reproduction, the reproduction can be resumed from the information following the information reproduced at the time of the stop.

In the above-mentioned embodiment, if it is expected that the servo controls can be normally operated (refer to FIG. 3 (Step S13; YES)), the information accumulated in the respective memories are immediately used to resume outputting the video output signal Svout and the audio output signal Saout to the external portion (refer to the step S14 of FIG. 3). However, besides it, if the accumulation amounts in the respective memories are less than the respective predetermined accumulation amounts, the output as the video output signal Svout of the accumulated information is started instead of the blue screen when the respective servo controls can be resumed similarly to the step S14. On the other hand, if the accumulation amounts in the respective memories are equal to or greater than the predetermined accumulation amounts, the output as the video output signal Svout may be started before the respective servo controls can be resumed.

In this case, it is possible to resume outputting the information further quickly while protecting the stop of the information output.

The above-mentioned embodiment describes both the executions of the determination of the accumulation amount in the decode memory 5 (refer to the step S7 of FIG. 2B) and the determination of the accumulation amount in the track buffer memory 3 (refer to the step S8 of FIG. 2B). However, besides the description, it is possible to carry out the stop preparing processing (refer to the step S3 of FIG. 2A) only by determining the accumulation amount in the track buffer memory 3 without determining the accumulation amount in the decode memory 5.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. 2000-99901 filed on Mar. 31, 2000 including the specification, claims, drawings and summary is incorporated herein by reference in its entirety.

What is claimed is:

1. An information reproducing apparatus comprising:
   a reading device for reading reproduction information recorded in an information record medium;
   a buffering device for temporarily accumulating the read reproduction information therein and outputting it;
   a reproduction controlling device for stopping reproducing the reproduction information while maintaining the reproduction information in the buffering device when a command indicative of stop of reproduction is requested from an external portion during the reproduction of the reproduction information, and outputting the reproduction information accumulated in the buffering device to resume reproducing it when a command indicative of resumption of the reproduction is requested from the external portion; and
   a monitoring device for monitoring an accumulation amount of the reproduction information in the buffering device,
   wherein the reproduction controlling device stops reading the reproduction information from the information record medium when the accumulation amount of the reproduction information reaches a reference accumulation amount after the stop is indicated, in case where the accumulation amount in the buffering device is less than the reference accumulation amount when the stop of the reproduction is indicated, the reference accumulation amount predetermined on the basis of an output of the reproduction information from the buffering device at the time of the resumption of the reproduction.

2. The information reproduction apparatus according to claim 1, wherein the reproduction controlling device stops reading the reproduction information from the information record medium after stopping outputting the reproduction information accumulated in the buffering device, when the stop of the reproduction is indicated.

3. The information reproducing apparatus according to claim 1, further comprising a stop information outputting device for outputting predetermined stop information to the external portion during the stop of the reproduction,
   wherein the reproduction controlling device starts outputting the reproduction information accumulated in the buffering device to the external portion instead of the stop information when a servo control required to read the reproduction information from the information record medium can be resumed at the time of resumption of the reproduction of the reproduction information.

4. The information reproducing apparatus according to claim 1, further comprising a stop information outputting device for outputting predetermined stop information to the external portion during the stop of the reproduction,
   wherein the reproduction controlling device starts outputting the reproduction information accumulated in the buffering device to the external portion instead of the stop information when a servo control required to read the reproduction information from the information record medium can be resumed at the time of resumption of the reproduction of the reproduction information.

5. The information reproducing apparatus according to claim 4,
   wherein the reproduction controlling device starts outputting the reproduction information when a servo control required to read the reproduction information from the information record medium can be resumed if the accumulation amount of the reproduction information in the buffering device is less than the reference accumulation amount, and starts outputting the reproduction information before the servo control can be resumed if the accumulation amount of the reproduction information is equal to or greater than the reference accumulation amount.

6. The information reproducing apparatus according to claim 1, further comprising:
   a decoder for decoding the reproduction information outputted from the buffering device; and
   a non-volatile storage device for storing a record position of the reproduction information on the information record medium therein, the reproduction information completely decoded by the decoder when the stop of the reproduction is indicated,
   wherein the reproduction controlling device resumes reading the reproduction information from the stored record position and then resume reproducing the reproduction information, if a supply of an electric power source to the information reproducing apparatus is cut off for the duration from the time when the stop of the reproduction is indicated to the time when the resumption of the reproduction is indicated.

7. The information reproducing apparatus according to claim 1, wherein the information record medium is an optical disc.

8. An information reproducing method comprising the processes of:

reading reproduction information recorded in an information record medium;

temporarily accumulating the read reproduction information in a buffering device;

stopping reproducing the reproduction information while maintaining the reproduction information in the buffering device when a command indicative of stop of reproduction is requested from an external portion during the reproduction of the reproduction information;

outputting the reproduction information accumulated in the buffering device to resume reproducing it when a command indicative of resumption of the reproduction is requested from the external portion;

monitoring an accumulation amount of the reproduction information in the buffering device; and stopping reading the reproduction information from the information record medium when the accumulation amount in the buffering device is less than a reference accumulation amount after the stop of the reproduction is indicated, in case where the accumulation amount of the reproduction information reaches the reference accumulation amount when the stop of the reproduction is indicated, the reference accumulation amount predetermined on the basis of an output of the reproduction information from the buffering device at the time of the resumption of the reproduction.

9. The information reproducing method according to claim 8, wherein the process of stopping reproducing the reproduction information stops reading the reproduction information from the information record medium after stopping outputting the reproduction information accumulated in the buffering device, when the stop of the reproduction is indicated.

10. The information reproducing method according to claim 8, further comprising the processes of:

outputting predetermined stop information to the external portion during the stop of the reproduction; and starting outputting the reproduction information accumulated in the buffering device to the external portion instead of the stop information when a servo control required to read the reproduction information from the information record medium can be resumed at the time of resumption of the reproduction of the reproduction information.

11. The information reproducing method according to claim 8, further comprising the processes of:

outputting predetermined stop information to the external portion during the stop of the reproduction; and starting outputting the reproduction information accumulated in the buffering device to the external portion instead of the stop information when a servo control required to read the reproduction information from the information record medium can be resumed at the time of resumption of the reproduction of the reproduction information.

12. The information reproducing method according to claim 11, wherein the process of starting outputting the reproduction information starts outputting the reproduction information when a servo control required to read the reproduction information from the information record medium can be resumed if the accumulation amount of the reproduction information in the buffering device is less than the reference accumulation amount, and starts outputting the reproduction information before the servo control can be resumed if the accumulation amount of the reproduction information is equal to or greater than the reference accumulation amount.

13. The information reproducing method according to claim 8, further comprising the processes of:

decoding the reproduction information outputted from the buffering device;

storing a record position of the reproduction information on the information record medium in a non-volatile storage device, the reproduction information completely decoded when the stop of the reproduction is indicated; and resuming reading the reproduction information from the stored record position and then resuming reproducing the reproduction information, if a supply of an electric power source to the information reproducing apparatus is cut off for the duration from the time when the stop of the reproduction is indicated to the time when the resumption of the reproduction is indicated.

14. The information reproducing method according to claim 8, wherein the information record medium is an optical disc.

* * * * *

UNITED STATES PATENT AND TRADEMARK OFFICE
CERTIFICATE OF CORRECTION

PATENT NO. : 6,757,229 B2
DATED : June 29, 2004
INVENTOR(S) : Toshiaki Izawa

It is certified that error appears in the above-identified patent and that said Letters Patent is hereby corrected as shown below:

<u>Title page,</u>
Item [30], Foreign Application Priority Data, replace "Mar. 13, 1910" with -- Mar. 31, 2000 --.

Signed and Sealed this

Twenty-sixth Day of October, 2004

JON W. DUDAS
*Director of the United States Patent and Trademark Office*